S. RACHELMAN.
APPARATUS FOR WASHING OUT PLACER GOLD.
APPLICATION FILED DEC. 26, 1908.
942,663.
Patented Dec. 7, 1909.
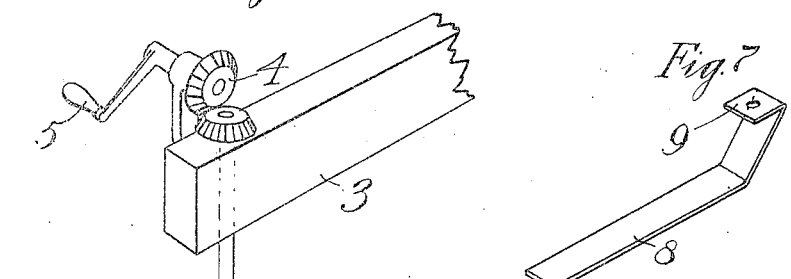
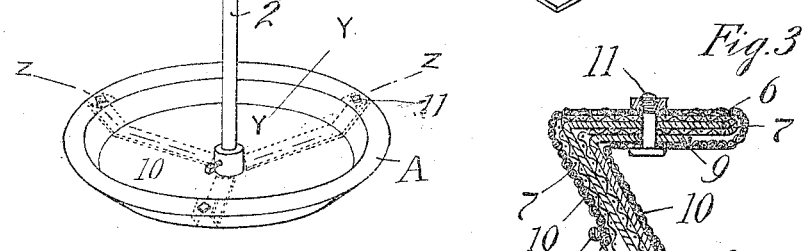
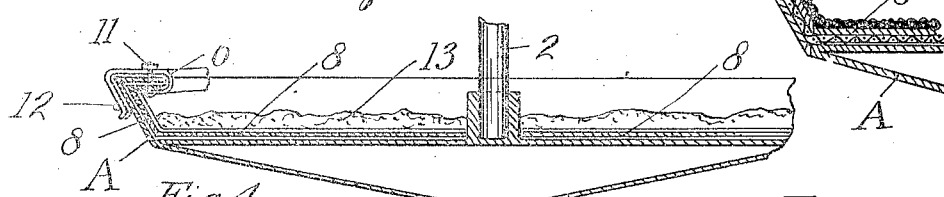
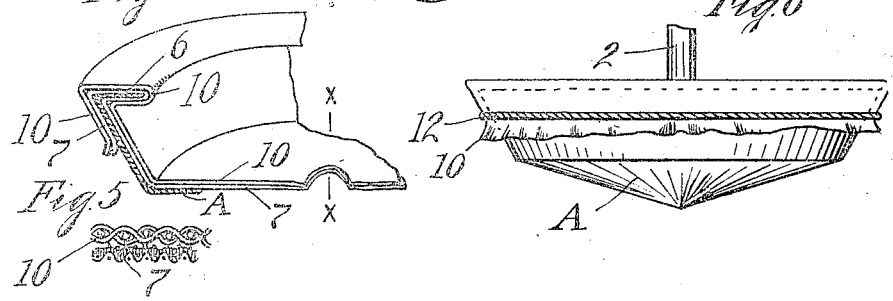
Witnesses,
George Voelker
H. Smith
Inventor,
Samuel Rachelman
by Lothrop & Johnson
his Attorneys

UNITED STATES PATENT OFFICE.

SAMUEL RACHELMAN, OF ST. PAUL, MINNESOTA, ASSIGNOR TO NORTHERN PLACER MACHINE COMPANY, OF ST. PAUL, MINNESOTA, A CORPORATION OF MINNESOTA.

APPARATUS FOR WASHING OUT PLACER-GOLD.

942,663.

Specification of Letters Patent. Patented Dec. 7, 1909.

Application filed December 26, 1908. Serial No. 469,509.

*To all whom it may concern:*

Be it known that I, SAMUEL RACHELMAN, a citizen of the United States, residing at St. Paul, in the county of Ramsey and State of Minnesota, have invented certain new and useful Improvements in Apparatus for Washing Out Placer-Gold, of which the following is a specification.

My invention relates to improvements in apparatus for washing out placer gold, its object being to provide an apparatus which will more thoroughly separate and retain the particles of gold than the ordinary constructions.

To this end my invention consists in the features of construction and combination hereinafter particularly described and claimed.

In the accompanying drawings forming part of this specification, Figure 1 is a perspective view of my improved invention, Fig. 2 is a section on line z—z of Fig. 1 partly broken away, Fig. 3 is a partial view on line z—z of Fig. 1 enlarged, Fig. 4 is a section on line y—y of Fig. 1, Fig. 5 is a section on line x—x of Fig. 4, Fig. 6 is a side elevation of the pan, and Fig. 7 is a detail of a clip forming part of my invention.

Referring to the drawings A represents a pan of any desired construction suitably supported as by a central shaft 2 journaled in the framework 3 and having operative connection 4 with a handle 5. The pan is formed with an inwardly extending circumferential rim 6.

The entire inner surface of the pan is covered or lined with a removable strongly waxed fabric 7 beeswax or equivalent material being used to treat the fabric. Upon said lining are placed magnetic plates 8 the ends 9 of said plates preferably extending over the rim 6. Over the magnetic plates 8 I place a covering 10 of loose fuzzy material such as carpet or coarse sack cloth or a covering of wire gauze. The outer edges of the linings 7 and 10 are carried over the rim of the pan as indicated in Figs. 2 and 3 and secured preferably by means of bolts 11 passing through the ends 9 of the metallic plates. The fabric is further secured by means of the cord 12 tied around the free edges of the linings on the outer sides of the pan.

In operation with the linings secured within the pan, as shown, the material 13 to be treated will be placed within the pan and the pan horizontally revolved in the water in the ordinary manner to cause the water to form an eddy with an inward and downward current. This current drives apart and separates the metals from the sand, gravel, etc., drawing with it downwardly the heavier materials such as the gold and so-called black or iron sand such as is usually found in placer mining. This iron sand will be attracted and held by the magnetic plates, the gold passing to and adhering to the waxed lining 7. The upper covering tends to prevent gravel, clay, etc., from passing through to an extent to ruffle the waxed lining and will also prevent the washing out of the metals from the pan for the reason that after these metals are forced through the cloth by the water current they are under comparatively still water, and are covered up and prevented from being forced out of the pan. The inwardly extending rim 6 also assists in preventing the gravel, clay, etc., from being suddenly washed out of the pan. After the waxed lining has taken up as much of the gold as possible, the linings and metallic plates are removed from the pan and the waxed lining boiled to melt the wax and precipitate the gold. The metallic plates are also cleaned of the black sands that are taken up and may then be placed in the pan in connection with a newly waxed lining and clean upper lining 10 ready for a second operation.

The plates 8 are substantially bar-magnets and are magnetized in any suitable manner as by electricity.

I claim as my invention:

1. In combination with a placer pan of the class described, a removable flexible waxed lining therefor, metallic plates arranged over said lining, and an upper openwork lining.

2. In combination with a placer pan of the class described, a flexible waxed lining therefor, metallic plates arranged over said lining and an upper lining of loose fuzzy material.

3. In combination with a placer pan of the class described formed with an inwardly extending rim, a waxed lining for said pan, metallic plates arranged upon said lining and an upper lining of loose material, the free edges of said linings passing over said rim and being secured in connection therewith.

4. In combination with a placer pan adapted for horizontal rotation, a lining of loose fuzzy material covering the interior of said pan and superposed layers of waxy and metal attracting material below said lining.

5. In combination with a placer pan of the class described, a lining of loose fuzzy material covering the interior of said pan, and a waxed surface arranged below said lining.

6. In combination with a placer pan of the class described, a lining therefor of loose fuzzy material and superposed layers of waxy material and metallic plates located below said lining.

7. In combination with a placer pan having an inwardly projected flange, a layer of waxed material laid in said pan, a layer of loose fuzzy material covering said waxed surface, and means securing said layers to said flange.

In testimony whereof I affix my signature in presence of two witnesses.

SAMUEL RACHELMAN.

Witnesses:
H. S. JOHNSON,
H. SMITH.